United States Patent
Hughes et al.

(10) Patent No.: US 9,732,907 B2
(45) Date of Patent: Aug. 15, 2017

(54) COOLING APPARATUS COMPRISING A THERMAL INTERFACE AND METHOD FOR RECONDENSING A CRYOGEN GAS

(75) Inventors: Timothy John Hughes, New Milton Hampshire (GB); Keith White, Abingdon Oxfordshire (GB)

(73) Assignee: Siemens Plc, Frimley, Camberley, Surrey (GB)

( * ) Notice: Subject to any disclaimer, the term of this patent is extended or adjusted under 35 U.S.C. 154(b) by 1676 days.

(21) Appl. No.: 10/594,618

(22) PCT Filed: May 12, 2005

(86) PCT No.: PCT/EP2005/005154
§ 371 (c)(1),
(2), (4) Date: Jan. 30, 2008

(87) PCT Pub. No.: WO2005/116515
PCT Pub. Date: Dec. 8, 2005

(65) Prior Publication Data
US 2008/0216486 A1 Sep. 11, 2008

(30) Foreign Application Priority Data
May 25, 2004 (GB) .................................. 0411607.5
Oct. 28, 2004 (GB) .................................. 0423895.2

(51) Int. Cl.
*F17C 13/00* (2006.01)
*F17C 3/08* (2006.01)
(Continued)

(52) U.S. Cl.
CPC ............ *F17C 3/085* (2013.01); *F25D 19/006* (2013.01); *F17C 2203/0312* (2013.01); *F17C 2203/0391* (2013.01); *F17C 2203/0629* (2013.01); *F17C 2221/012* (2013.01); *F17C 2221/014* (2013.01); *F17C 2221/016* (2013.01); *F17C 2221/017* (2013.01); *F17C 2223/0161* (2013.01); *F17C 2223/033* (2013.01);
(Continued)

(58) Field of Classification Search
CPC ..... F17C 3/085; F25D 19/006; F25B 2400/17
USPC ...................... 62/47.1, 48.1, 48.2, 48.3, 51.1
See application file for complete search history.

(56) References Cited

U.S. PATENT DOCUMENTS 3,894,403 A * 7/1975 Longsworth .......... F25D 19/006
505/892
4,765,153 A * 8/1988 Wachi ..................... F17C 3/085
62/383
(Continued)

FOREIGN PATENT DOCUMENTS

EP 0 720 024 B1 7/1996
EP 1 418 388 A2 5/2004

OTHER PUBLICATIONS

International Search Report dated Aug. 3, 2005 with PCT/ISA/237 (Nine (9) pages).

*Primary Examiner* — Frantz Jules
*Assistant Examiner* — Brian King
(74) *Attorney, Agent, or Firm* — Crowell & Moring LLP

(57) ABSTRACT

A thermal interface between a removable cryogenic refrigerator (4) and an article (10) to be cooled by the cryogenic refrigerator. The thermal interface consists of a recondensing chamber filled with a gas (12), the recondensing chamber being in thermal contact with a cooling surface (9) of the refrigerator and the article (10) to be cooled.

10 Claims, 2 Drawing Sheets

(51) Int. Cl.
*F25D 19/00* (2006.01)
*H01F 6/04* (2006.01)

(52) U.S. Cl.
CPC ............. *F17C 2227/0353* (2013.01); *F17C 2227/0372* (2013.01); *F17C 2227/0379* (2013.01); *F17C 2227/0381* (2013.01); *F17C 2227/045* (2013.01); *F17C 2260/031* (2013.01); *F17C 2270/0536* (2013.01); *F25B 2400/17* (2013.01); *H01F 6/04* (2013.01); *Y02E 60/321* (2013.01)

(56) References Cited

U.S. PATENT DOCUMENTS

| | | | |
|---|---|---|---|
| 4,802,345 A * | 2/1989 | Curtis | 62/51.1 |
| 5,381,666 A * | 1/1995 | Saho | F25B 9/10 62/298 |
| 5,586,437 A | 12/1996 | Blecher et al. | |
| 5,613,367 A * | 3/1997 | Chen | G01R 33/3815 62/295 |
| 5,701,744 A * | 12/1997 | Eckels et al. | 62/47.1 |
| 5,782,095 A * | 7/1998 | Chen | G01R 33/3815 62/47.1 |
| 5,918,470 A * | 7/1999 | Xu | F25D 19/006 335/216 |
| 6,246,308 B1 | 6/2001 | Laskaris et al. | |
| 7,131,276 B2 * | 11/2006 | Pan et al. | 62/6 |
| 7,310,954 B2 * | 12/2007 | Miki | 62/51.1 |
| 2004/0194473 A1 * | 10/2004 | Daniels | F17C 3/085 62/6 |
| 2005/0229609 A1 * | 10/2005 | Kirichek et al. | 62/6 |

* cited by examiner

COOLING APPARATUS COMPRISING A THERMAL INTERFACE AND METHOD FOR RECONDENSING A CRYOGEN GAS

BACKGROUND OF THE INVENTION

MRI (magnetic resonance imaging) systems are used for medical diagnosis. A requirement of an MRI magnet is that it provides a stable, homogeneous, magnetic field. In order to achieve stability it is common to use a superconducting magnet system which operates at very low temperature, the temperature being maintained by cooling the superconductor, typically by immersion in a low temperature cryogenic fluid, such as liquid helium, liquid neon, liquid hydrogen or liquid nitrogen. Cryogenic fluids are expensive, and it is desirable that the magnet system should be designed and operated in a manner to reduce to a minimum the amount of cryogenic fluid used.

The superconducting magnet system typically comprises a set of superconductor windings for producing a magnetic field, contained within a cryostat. The cryostat typically comprises a cryogenic fluid vessel which contains the superconductor windings, one or more thermal shields completely surrounding the cryogenic fluid vessel, and a vacuum jacket completely enclosing the one or more thermal shields. It is common practice to use a refrigerator to cool the thermal shields to a low temperature in order to reduce the heat load onto the cryogen vessel. It is also known to use a refrigerator to directly refrigerate the cryogen vessel, thereby reducing or eliminating the cryogen fluid consumption.

MRI magnet systems use refrigerators to reduce the heat load onto the cryogen vessel in order to reduce or eliminate the consumption of cryogenic fluid. The refrigerator must make good thermal contact to the objects to be cooled whilst being easy to remove and replace for servicing.

The refrigerator is subject to wear, and must be periodically serviced and then replaced after a certain time in order to maintain adequate system performance. The refrigerator is therefore placed in a means of removably interfacing it to the magnet system.

Achieving good thermal contact at low temperature is difficult, and whilst adequate thermal contact can be achieved using pressed contacts at the thermal shield temperatures, these pressed contacts are difficult to re-make once the refrigerator has been removed and replaced, for example as required for servicing. The thermal contact provided needs to allow such removal and replacement without significant degradation in the thermal transfer efficiency of the thermal contact, otherwise it becomes more difficult to achieve the desired refrigeration at very low temperature.

Known solutions are discussed, for example, in U.S. Pat. Nos. 5,782,095, 5,613,367, 5,918,470; and in European Patent Application EP 0 720 024 A1.

In each of these described solutions, a cryogenic refrigerator is provided, removably mounted within a sleeve. In each case, the sleeve terminates in a heat sink which is thermally linked in some way to a recondensing surface exposed to a cryogen vessel. In U.S. Pat. No. 5,613,367, the recondensing surface 32 is directly exposed to the interior of the cryogen vessel. In each of the remaining solutions mentioned above, a separate recondensing chamber is provided, adjacent to the heat sink. Gas supply and liquid return pipes are provided to link the recondensing chamber with the cryogen vessel. In each of these solutions, there exists a requirement to provide an effective thermal interface between the refrigerator and the heat sink. In U.S. Pat. No. 5,918,470 and EP 0 720 024, this is provided by a compressible indium washer. In U.S. Pat. No. 5,613,367, the corresponding thermal interface relies upon effective cleaning of mechanically touching parts.

Problems are encountered when removing and replacing the refrigerator, in that the thermal coupling between the refrigerator and the heat sink may degrade, or at least is difficult to maintain. When the refrigerator is removed from its sleeve, the interior of the sleeve is exposed to the atmosphere. The heat exchangers will be at very low temperatures, and it is difficult to prevent atmospheric gases from condensing or freezing on the inside of the sleeve.

Such condensate may be removed by bringing the temperature of the sleeve to ambient, but this will result in a more lengthy process for removal and replacement of the refrigerator, and may lead to unwanted cryogen loss. Furthermore, the use of indium washers requires that a new indium washer be used every time that the refrigerator is removed and replaced. Indium washers suffer from creep—that is, the indium washer providing the thermal contact between the refrigerator and the heat exchanger changes shape over time, resulting in degradation of the thermal interface. In addition, when the refrigerator is removed for servicing, it is difficult to remove all traces of the old indium washer before fitting a new one. Any residue of the earlier washer will cause non-uniform compression of the later washer, resulting in a sub-standard thermal interface.

SUMMARY OF THE INVENTION

The present invention accordingly aims to provide an effective thermal interface for conducting heat between a removable refrigerator and a heat exchanger, such that the thermal interface is simple to make, and does not degrade with time, or with repeated removal of the refrigerator. For this purpose, the thermal interface includes a recondensing chamber that is filled with a gas and is in thermal contact with a cooling surface of the refrigerator and the article to be cooled.

In a certain application, the invention aims to provide adequate thermal contact between a cryogenic gas to be cooled and a refrigerator used for cooling whilst maintaining ease of removal of the refrigerator for servicing and eliminating the possibility of air entering the cryogen vessel due to the removal of the refrigerator.

Other objects, advantages and novel features of the present invention will become apparent from the following detailed description of the invention when considered in conjunction with the accompanying drawings.

DETAILED DESCRIPTION OF THE INVENTION

As discussed above, it is known in itself to provide recondensation by action of a refrigerator on a cryogenic gas. For example, a refrigerator intended to cool a cryogen may efficiently be interfaced to the gas to be cooled by situating a cooling part of the refrigerator within the cryogen gas. Condensation takes place on the cooling part of the refrigerator, and the recondensed cryogen falls back into the cryogen vessel.

Figure 1:
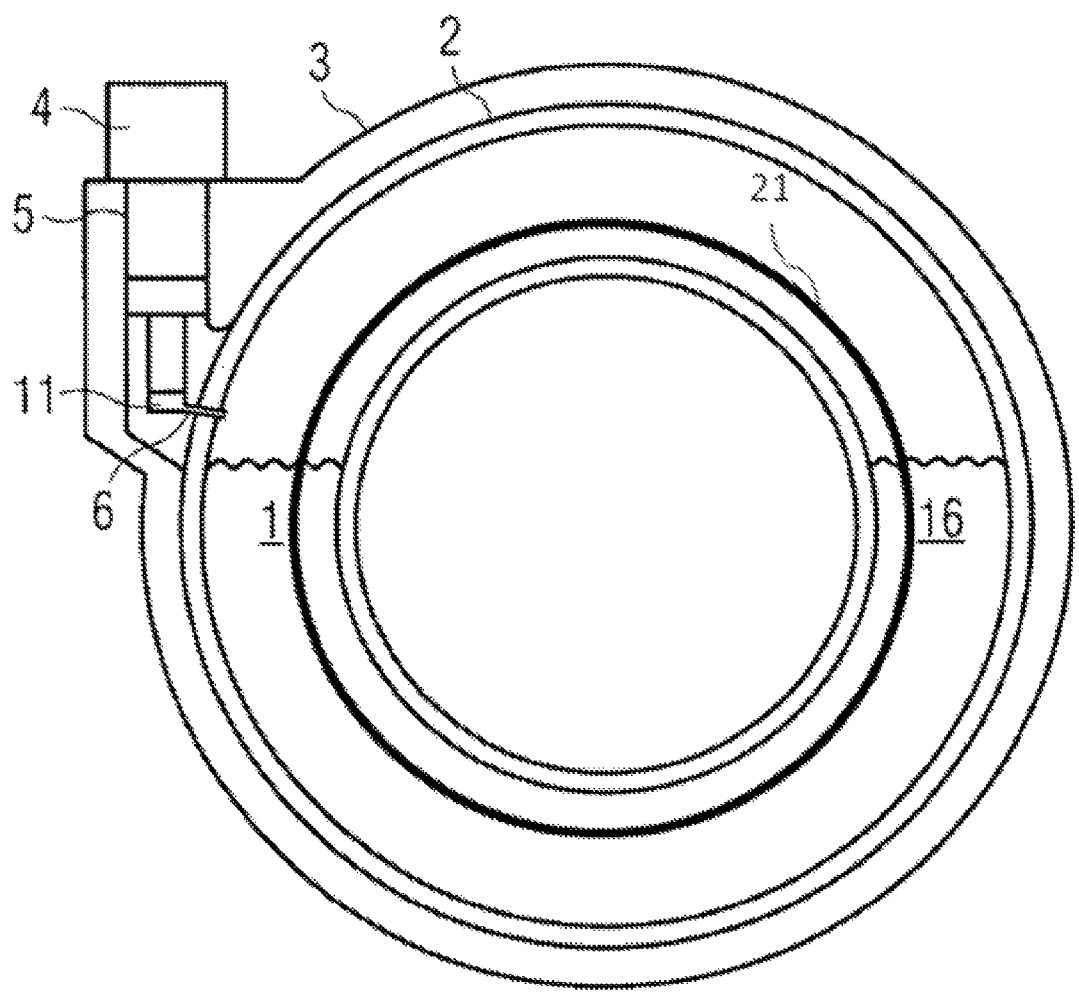
FIG. 1 shows a schematic cross section of a known MRI system.

FIG. 1 shows a schematic of a known MRI magnet system fitted with a refrigerator 4. A cryostat comprises a liquid cryogen vessel 1, containing a superconductor magnet in the form of superconducting windings 21 (which are schematically illustrated in the figure) and liquefied cryogen 16, and is surrounded by one or more thermal shields 2, which are in turn completely surrounded by a vacuum jacket 3. Removably fitted to the magnet system is refrigerator 4 thermally interfaced to a cryogen recondensing chamber 11 by interface sleeve 5 so as to cool the thermal shields and recondense cryogen gas and deliver it back to the cryogen vessel 1 by tube 6.

The MRI system discussed with reference to FIG. 1 is typical of MRI systems employing superconductors requiring liquid helium temperatures. In alternative systems, so-called high temperature superconductors may be used. In such systems, the cryogen may be liquid nitrogen. No thermal shields 2 would be required, but multilayer insulation would typically be provided instead. A single stage refrigerator 4 would be sufficient.

The present invention provides an improved thermal interface, particularly suitable for use between a removable refrigerator and an article to be cooled, for example in an MRI system at interface sleeve 5 in FIG. 1. The thermal interface of the present invention preferably consists of a recondensing chamber filled with a gas, the recondensing chamber being in thermal contact with a cooling surface of the refrigerator and the article to be cooled.

According to an embodiment of the present invention, to provide recondensation of cryogen gas in the cryogen vessel 1, the condensation process is employed twice in adjoining chambers so that the refrigerator can be isolated from the gas and liquid cryogen used to cool the superconductor magnet, while providing an effective thermal interface which does not degrade with time or with repeated removal and replacement of the refrigerator.

Figure 2:
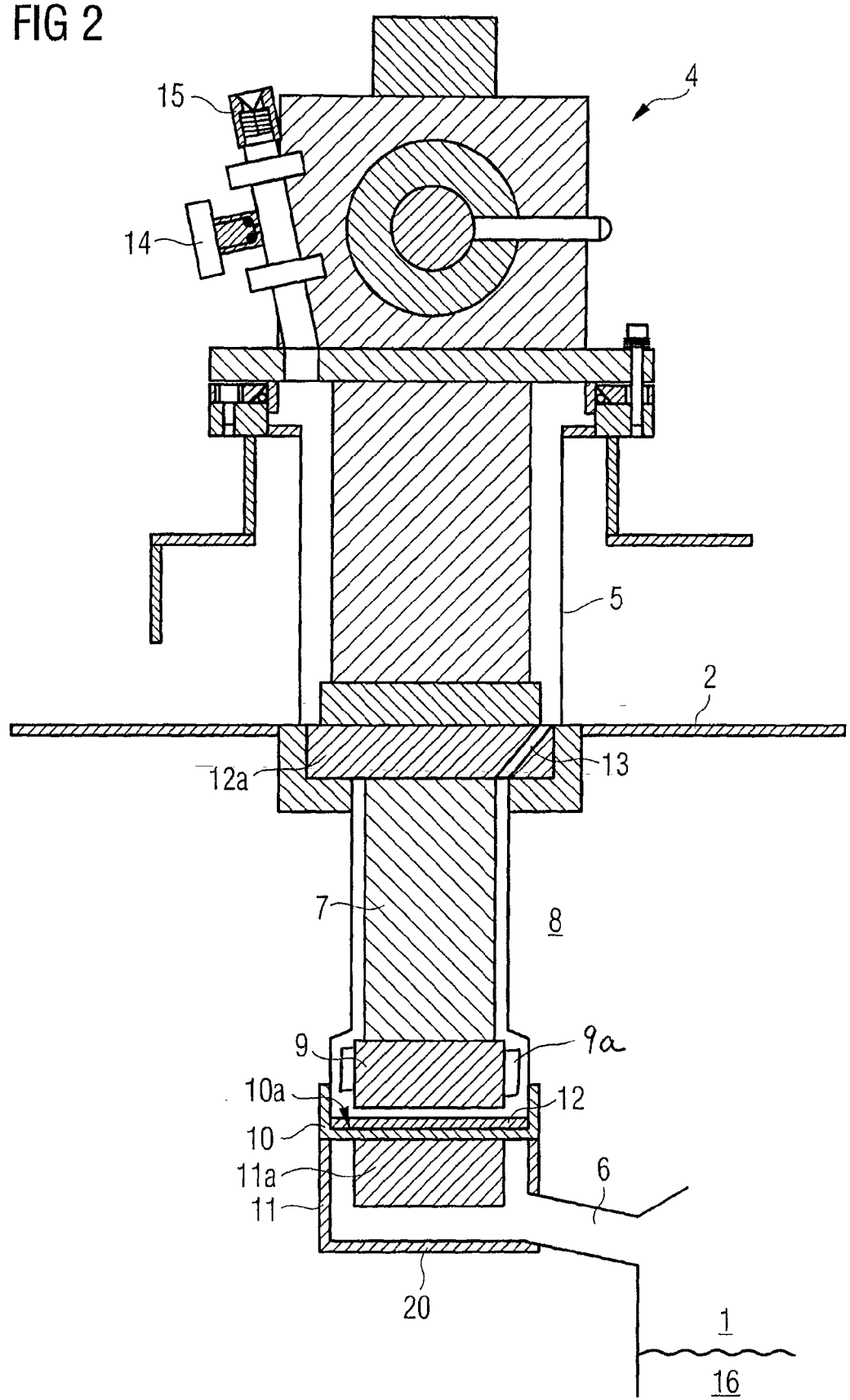
FIG. 2 shows a refrigerator mounted in a refrigerator sleeve, including a thermal interface according to an embodiment of the present invention.

FIG. 2 shows a thermal interface according to an embodiment of the present invention. The bottom of the interface sleeve 5 is terminated in a leak tight manner with thermally conducting base 10 which seals the sleeve and isolates it from the cryogen fluid and gas in cryogen vessel 1. Base 10 accordingly forms part of the wall of the cryogen vessel 1 as well as forming part of the wall of sleeve 5. Base 10 is also connected, preferably in a leak tight manner, as part of the wall of a second recondensing chamber 11. Recondensing chamber 11 encloses a recondenser 11a in thermal contact with base 10, and is in communication with cryogen vessel 1 through gas cryogen inlet/liquid cryogen outlet tube 6. A two-stage refrigerator 4 is placed within refrigerator interface sleeve 5. The first stage heat exchanger 12a of the refrigerator 4 is in thermal contact with shield 2. This contact may be either direct as shown or by known intermediaries such as flexible copper braid. The second stage 7 of the refrigerator 4 is situated in the lower part 8 of refrigerator interface sleeve 5. Second stage 7 terminates in cooling stage 9 which is cooled by the refrigerator to a low temperature, for example about 4K. The features described in this paragraph are conventional, and correspond to the arrangement shown in U.S. Pat. No. 5,918,470.

According to an aspect of the present invention, the sleeve 5 is filled with a cryogen gas. Cooling stage 9 preferably does not make mechanical contact with base 10. Cooling stage 9 operates to cool the cryogen gas to its liquefaction temperature. Cooling stage 9 preferably has fins (shown schematically as 9a in FIG. 2) so as to improve recondensation heat transfer. As will be understood by those skilled in the art, and according to an aspect of the present invention, the interior of sleeve 5 is arranged as a secondary recondensing chamber.

Cooling stage 9 liquefies the gas within the sleeve 5. The resultant liquid cryogen 12 accordingly partly fills the bottom of sleeve 5 and provides a heat transfer medium for transferring heat from gaseous cryogen from cryogen vessel 1 in recondensing chamber 11, via recondenser 11a and base 10 to secondary recondenser 9, by boiling at base 10 and recondensation at cooling stage 9.

Base 10 is preferably made from highly thermally conducting material, typically copper, and provides good thermal conduction from its upper surface 10a in contact with liquid 12 to its lower surface and on to recondenser 11a. The upper surface of cryogen liquid 12 should preferably not touch the secondary recondenser 9 since this would reduce the area available for recondensation, and therefore would also reduce the rate of heat transfer. Liquid cryogen 12 and its gaseous counterpart provide a non-contact ('recondenser') thermal interface between cooling stage 9 and base 10.

Upper surface 10a of base 10 may be finned or otherwise machined or prepared so as to increase the area for heat transfer by boiling, but the preparation of the surface should be such as to allow free flow of liquid 12 across the upper surface 10a of base 10.

Operation of the thermal interface of the present invention will now be described. First stage heat exchanger 12a between the refrigerator and the sleeve is provided with at least one gas path 13 so that gas can pass between the upper and lower parts of the interface sleeve 5 for evacuation of the sleeve, refilling with cryogen gas, and release of cryogen gas, as and when appropriate.

On first putting the refrigerator into the interface sleeve 5, with both the refrigerator and the magnet system hot, air is evacuated from the interface sleeve 5 through port 14 and the interface sleeve is then filled with clean cryogen gas, again through port 14. This process may be repeated a number of times to ensure purity of the cryogen gas remaining in the interface sleeve.

During cooling of the magnet system and the refrigerator to operating temperature, or when the magnet system and refrigerator have been cooled to operating temperature, further cryogen gas may be slowly admitted through port 14 into the interface sleeve. The gas is admitted slowly so that the refrigerator can cool and liquefy it as appropriate. The quantity of gas admitted is measured so that the appropriate quantity of liquid 12 is condensed in the bottom of the sleeve.

After subsequent cycles of removing, servicing and replacing the refrigerator, when the magnet system is cold, but the refrigerator is still hot (relative to the temperature in the cryogenic vessel 1), air is evacuated from the interface sleeve 5 through port 14 and the sleeve is then filled with a clean cryogen gas. This may be repeated a number of times to ensure purity of the gas remaining in the interface sleeve 5. The refrigerator 4 is then started and allowed to cool to its operating temperature. When the refrigerator is fully cold, or during the cooling, a quantity of cryogen gas is slowly admitted through port 14 into the sleeve. The gas is admitted slowly so that the refrigerator can cool and liquefy it as appropriate. The quantity of gas admitted is measured so that the appropriate quantity of liquid 12 is condensed in the bottom of the sleeve.

When the refrigerator is turned off for servicing, or if the refrigerator should be turned off or stopped unintentionally, the liquid cryogen 12 will boil and evaporate. A pressure relief valve 15 is fitted to the interface sleeve 5 to prevent excessive pressure developing in the sleeve under these circumstances. Alternatively, since the quantity of liquid cryogen 12 is small, it could be allowed to boil off into a reservoir and then recondensed when the refrigerator restarted. A volume of about 2 liters pressurized to about 2 bar ($2\times10^5$ Pa) would be sufficient to provide adequate gas for recondensing into a heat transfer liquid 12.

The interface of the present invention may be used to interface refrigerator 4 to a recondenser 11a. While any suitable gas 12 may be used in the secondary recondenser 9,5, the boiling point of the gas 12 of the secondary recondenser should be no greater than the boiling point of the gas in the recondensation chamber 11 and the cryogen vessel 1. The same gas may be used in both recondensers. If gases with differing boiling points are used, a thermal resistance may be placed in the thermal path 10 to improve the efficiency of the recondenser 11a.

According to an aspect of the present invention, the thermal interface between cooling stage 9 and the object 10 to be cooled is provided by a closed recondensation chamber. When the refrigerator is removed for servicing, the secondary recondensation chamber 8 is opened. However, no interference is caused to the recondensation chamber 11.

While the present invention has been described with reference to a limited number of specific embodiments, numerous modifications and adaptations may be made within the scope of the present invention, as will be apparent to those skilled in the art.

For example, in the particularly described embodiment, the cooled object 10 itself forms part of a recondensation chamber. However, the invention is not limited to providing a thermal interface to recondensation chambers. Indeed, the present invention usefully finds application in any situation where a refrigerator may need to be periodically removed and replaced without difficulty and without deterioration in the thermal interface between the refrigerator and the object to be cooled. The invention may also usefully be employed in situations where the refrigerator does not need to be repeatedly removed, since the thermal interface of the present invention is predictable and simple to set up. It does not have such demanding requirements of mechanical perfection as in the case of thermal interfaces which reply on accurate mechanical contact, or the interposition of indium washers.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. Cooling apparatus comprising:
   a removable cryogenic refrigerator mounted within a sleeve, wherein a volume within the sleeve surrounding the refrigerator forms a closed recondensing chamber; and
   a thermal interface between the removable cryogenic refrigerator and a cryogen vessel to be cooled by the cryogenic refrigerator; wherein,
   the thermal interface is a non-contact thermal interface between a cooling stage of the refrigerator and a base of the closed recondensing chamber and includes: a gas held in thermal contact with the cooling stage of the refrigerator, the base of the closed recondensing chamber, and a pool of liquid in contact with the base but not the cooling stage;
   the cryogen vessel is cooled by thermal conduction through the base of the closed recondensing chamber; and
   the cooling stage does not make mechanical contact with the base of the closed recondensing chamber,
   wherein the base of the closed recondensing chamber is in direct thermal contact with a further recondensing chamber, arranged for the recondensation of a cryogen gas and sealed from the closed recondensing chamber of the thermal interface,
   wherein the base forms part of a wall of the cryogen vessel and forms part of a wall of the sleeve.

2. The cooling apparatus according to claim 1, wherein the gas condenses to the liquid on the cooling stage and falls under gravity into contact with the base of the closed recondensing chamber.

3. The cooling apparatus according to claim 1, wherein the cooling stage is provided with fins.

4. A cryostat comprising the cryogen vessel containing a liquefied cryogen, and being connected for cooling by the cooling apparatus according to claim 1.

5. An MRI system comprising superconducting windings contained within a cryostat as claimed in claim 4.

6. A thermal interface, comprising a closed recondensing chamber that is disposed around a recondensing refrigerator and is in thermal contact with a cryogen vessel that is to be cooled, through a base of the closed recondensing chamber, wherein:
   the closed recondensing chamber is formed by a volume within a sleeve surrounding the recondensing refrigerator, the closed recondensing chamber filled with a gas which is recondensed into a liquid by the recondensing refrigerator, the liquid forming a pool that is in contact with the base but not the recondensing refrigerator,
   thermal contact between the recondensing refrigerator and the cryogen vessel is provided by recondensation of the gas and through the base of the closed recondensing chamber,
   the thermal interface is a non-contact thermal interface between a cooling stage of the refrigerator and the base of the closed chamber,
   the cooling stage does not make mechanical contact with the base of the closed recondensing chamber, and
   the base of the closed recondensing chamber is in direct thermal contact with a further recondensing chamber, arranged for the recondensation of a cryogen gas and sealed from the closed recondensing chamber of the thermal interface,
   the base forms part of a wall of the cryogen vessel and forms part of a wall of the sleeve.

7. A method for recondensing a cryogen gas within a cryostat comprising the steps of:
   providing a recondensing surface exposed to the cryogen gas within the cryostat and arranged in thermal contact with a wall of a closed recondensing chamber of the thermal interface as recited in claim 6; and
   cooling the recondensing surface by cooling the component through the wall of the closed recondensing chamber of the thermal interface,
   wherein the wall of the closed recondensing chamber is in direct thermal contact with a further recondensing chamber, arranged for the recondensation of a cryogen gas and sealed from the closed recondensing chamber of the thermal interface.

8. A cooling apparatus comprising:
a cryogenic refrigerator mounted within a sleeve, wherein a volume within the sleeve surrounding the refrigerator forms a closed recondensing chamber;
a thermal interface that is in thermal contact with a cooling stage of the refrigerator, and with a cryogen vessel that is to be cooled; wherein
said thermal interface comprises the closed recondensing chamber, at least a portion of which is in thermal contact with said cooling stage of the refrigerator;
the closed recondensing chamber is filled with a cryogen gas, and is separated and sealed from a cryogen fluid contained in the cryogen vessel, by a base of the closed recondensing chamber that is in thermal contact with said cryogen fluid in said cryogen vessel;
said recondensing chamber is configured such that, in an operating state, gas that is liquefied in said recondensing chamber accumulates adjacent said base but does not contact the cooling stage, and is boiled off by heat transferred from gaseous cryogen fluid in said cryogen vessel; and
the cooling stage does not make mechanical contact with the base of the closed recondensing chamber,
wherein the base of the closed recondensing chamber is in direct thermal contact with a further recondensing chamber, arranged for the recondensation of a cryogen gas and sealed from the closed recondensing chamber of the thermal interface,
wherein the base forms part of a wall of the cryogen vessel and forms part of a wall of the sleeve.

9. A cryogenic cooling apparatus comprising:
a cryogenic refrigerator mounted within a sleeve, wherein a volume within the sleeve surrounding the refrigerator forms a first recondensing chamber that is filled with a gas and is in thermal contact with a cooling stage of said cryogenic refrigerator; and
a second recondensing chamber that is in thermal contact with a base of said first recondensing chamber and with a cryogen vessel that is to be cooled; wherein,
said first recondensing chamber is separated from said second recondensing chamber by said base which forms a heat transfer path between said first and second recondensing chambers, and which seals and isolates said first recondensing chamber from said second recondensing chamber;
said second recondensing chamber is in thermal contact with a cryogenic fluid in said cryogen vessel; and
said gas in said first recondensing chamber forms a non-contact thermal interface between said cooling stage and said base, wherein said cooling stage does not make mechanical contact with said base, wherein said gas condenses to form a liquid pool in contact with the base but not the cooling stage,
wherein the base of the first recondensing chamber is in direct thermal contact with a second recondensing chamber, arranged for the recondensation of a cryogen gas and sealed from the first recondensing chamber of the thermal interface,
wherein the base forms part of a wall of the cryogen vessel and forms part of a wall of the sleeve.

10. The cryogenic cooling apparatus according to claim 9, wherein said second recondensing chamber is in fluid communication with cryogenic fluid that is contained in an interior of said cryogen vessel.

* * * * *